Aug. 7, 1951          O. BLUM          2,563,389
LEVELING MOUNT FOR CAMERA TRIPODS
Filed Oct. 12, 1949          3 Sheets-Sheet 1
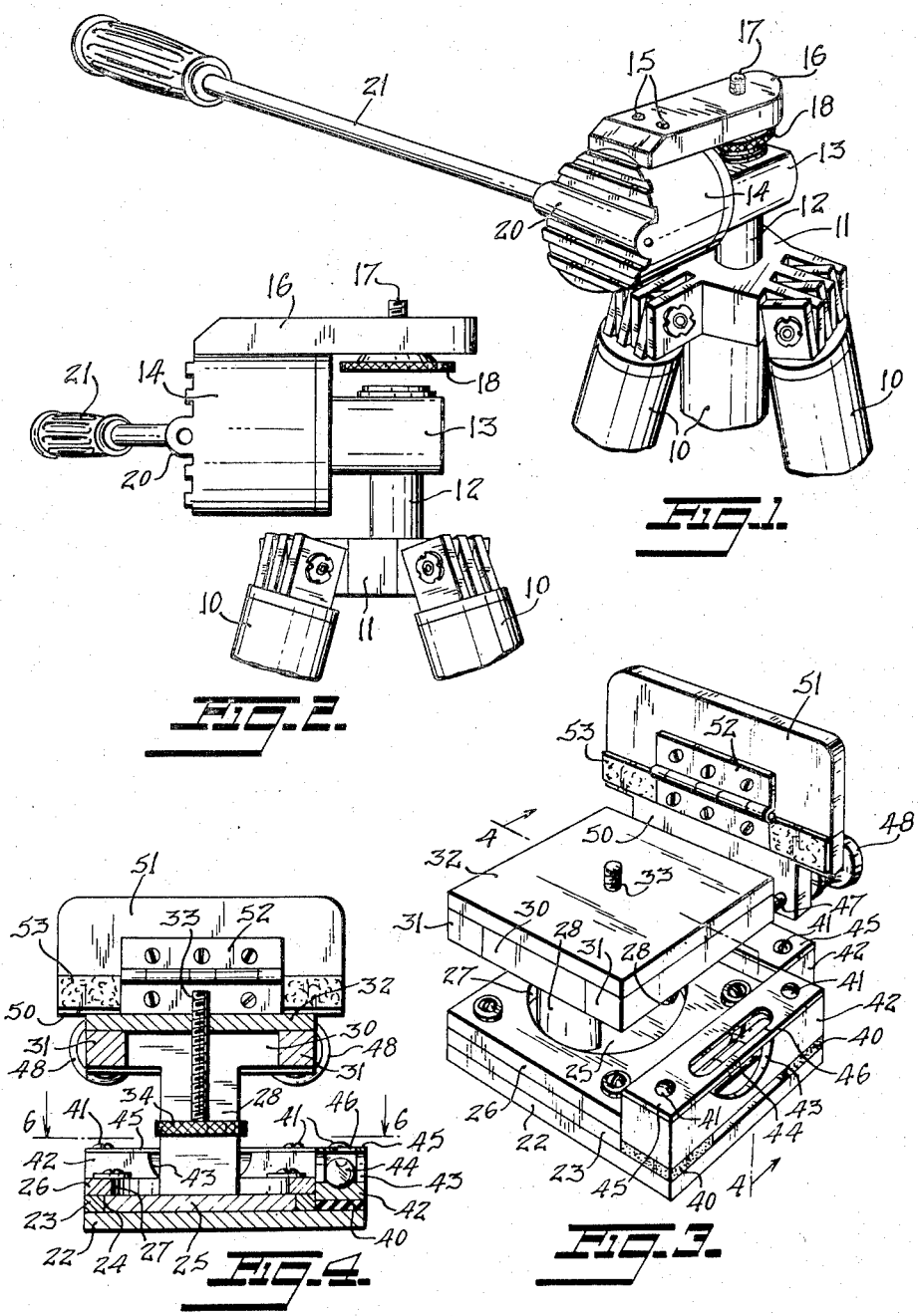
INVENTOR.
OTTO BLUM
BY
ATTORNEY Aug. 7, 1951     O. BLUM     2,563,389
LEVELING MOUNT FOR CAMERA TRIPODS
Filed Oct. 12, 1949     3 Sheets-Sheet 2

INVENTOR.
Otto Blum
BY
ATTORNEY

Aug. 7, 1951

O. BLUM 2,563,389

LEVELING MOUNT FOR CAMERA TRIPODS

Filed Oct. 12, 1949

INVENTOR.
Otto Blum
BY
*Zoltan H Holacek*
ATTORNEY

Patented Aug. 7, 1951

2,563,389

UNITED STATES PATENT OFFICE 2,563,389

LEVELING MOUNT FOR CAMERA TRIPODS

Otto Blum, New York, N. Y.

Application October 12, 1949, Serial No. 121,007

12 Claims. (Cl. 248—278)

This invention relates to new and useful improvements in combined leveling and swivelable mounts for cameras, and, more particularly, to a swivelable, level indicating camera mounting adapted for use with known tripod camera stands which are themselves swivelable in horizontal and vertical directions.

One object of the invention is the provision of a camera mount having means to indicate levelness thereof on either horizontal axis and having means to swivel a camera mounted thereon, in any horizontal direction without disturbing the set level state of the mount.

Another object of the invention is to provide said mount not only with the ordinary camera clamping means but also with auxiliary clamping means adjustable in a plurality of ways to effect clamping of variously sized cameras.

A further object of the invention is to construct said mount so as to permit of its being secured on the heads of known tripod camera stands by the same means formerly utilized to clamp cameras thereon.

A still further object of the invention is to construct and arrange the several elements of said mount so as to permit of the facile and economical manufacture and assembly thereof.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of the swivel head of a known tripod camera stand with portions of the legs of said tripod also being shown.

Fig. 2 is a side view of the head shown in Fig. 1.

Fig. 3 is a perspective view of the camera mount of the invention.

Fig. 4 is a vertical sectional view of said mount on line 4—4 of Fig. 3 and looking in the direction of the arrows applied to said line.

Fig. 9 is a fragmentary, perspective view illustrating a modified manner of securing said mount on the tripod head.

Figure 5:
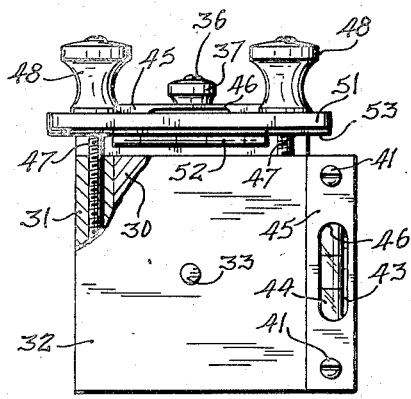
Fig. 5 is a plan view of said mount with certain parts broken away to show the internal construction.

It is deemed desirable before entering into a detailed description of the first form of the invention shown in Figs. 1 to 8, to first describe briefly the tripod to which, in the illustrated instance, the invention is applied.

Referring to Figs. 1 and 2, the three legs 10 of the tripod are pivoted at their upper ends in a bearing block 11 having also a vertical bore for a post 12 which at its upper end is journalled in a horizontal member 13 projecting from a cylindrical housing 14 wherein it is journalled. The upper part of housing 14 has secured thereto by screws 15 a camera supporting plate 16 which projects outward over member 13 and is provided with a screw 17 having a large head 18 between the plate and said member. In use, a camera is placed on plate 16 whereon it is secured by drawing up screw 17 in the threaded hole provided in the base of all cameras adapted to be used with a tripod.

The outer face of housing 14 is provided with a semi-cylindrical extrusion 20 into which is threaded the end of a handle 21 by which said housing 14 and plate 16 may be rocked about member 13 to move said plate to a position where its surface is level. When the level is found, the handle is twisted and through mechanism within housing 14 said housing and member 13 are locked together. This mechanism however forms no part of the invention and is therefore not shown or described.

After plate 16 has been levelled along on a horizontal axis as above described, handle 21 and housing 14 are rotated horizontally 90° and the leveling process repeated.

The plate 16 and the camera supported thereby are then level along both horizontal axes and all that is needed is to rotate handle 21 horizontally to point the camera in the desired direction. Herein however lies the chief fault with such tripods, for in turning said handle to point the camera, the horizontal setting is disturbed. It has also been found that what to the eye seems to be a horizontal setting very often is not, with the result that pictures taken by the camera are distorted.

To cure these ills the invention provides means to indicate when the level is obtained by each setting of handle 21, and means whereby the camera can be rotated to the desired picture taking position without moving handle 21 and therefore without disturbing the level state of plate 16.

The mount of the invention comprises a base plate 22 (Figs. 3 and 4) surmounted by a guide plate 23 having a circular cutout 24 (see also Fig. 6) to receive a circular plate 25 of substantially the same size as said cutout, the circular plate being maintained in said cutout by another plate 26 having a cutout 27 smaller than cutout 24.

Projecting upward from the circular plate are a pair of oppositely disposed pillars 28 having their outer edges curved to complement the curvature of the periphery of cutout 27. At their upper ends, pillars 28 are formed into blocks 30 secured between cross bars 31 upon which is fastened a camera supporting plate 32. A screw 33 projects upward through the center of plate 32, said screw having a large head 34 positioned between pillars 28 for manipulation by the fingers and being adapted to secure a camera on plate 32 in the same manner as screw 17 (Figs. 1 and 2) described above.

The base plate 22 is provided with a threaded hole for cooperating with screw 17 (Fig. 7) in securing the mount on the support plate 16 of the tripod head. It will be seen, therefore, that the mount is easily and quickly secured on and removed from the tripod head.

In another embodiment of the invention, the support plate 16 is removed from the tripod head and base plate 22 is provided with a groove 35 (Fig. 9) curved to complement the curvature of housing 14, upon which said groove is fitted, the screws 15 (Fig. 1) formerly used to fasten said support plate in place then being used to fasten base plate 22 on said housing. In this manner the mount of the invention can be fastened permanently in place on the tripod head.

It will be seen therefor that a camera secured on plate 32 can be turned in any direction desired without disturbing handle 21, the turn table comprising the plate 32, the pillars 28 and circular plate 25 all turning with the camera, but base plate 22 and the tripod head remaining stationary.

Figure 6:
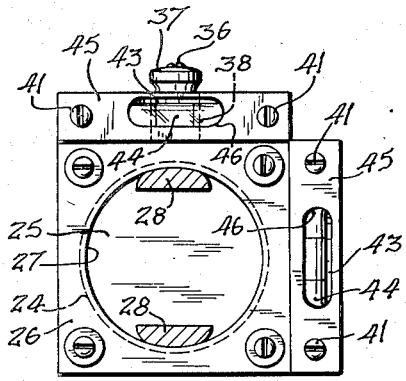
Fig. 6 is a horizontal sectional view of the base portion of said mount on line 6—6 of Fig. 4.
Figure 7:
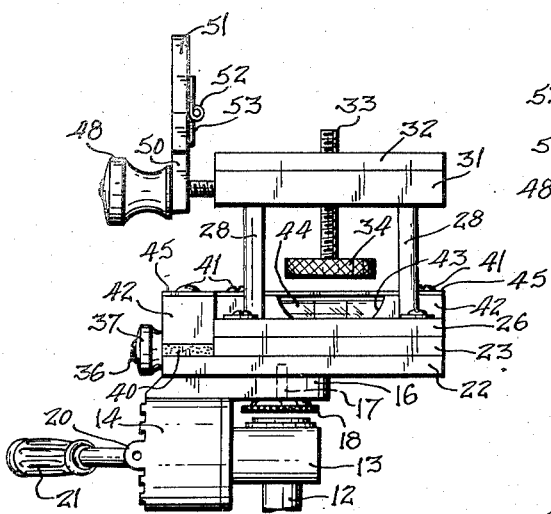
Fig. 7 is a side view of the said mount secured in place on the tripod head of Figs. 1 and 2.
Figure 8:
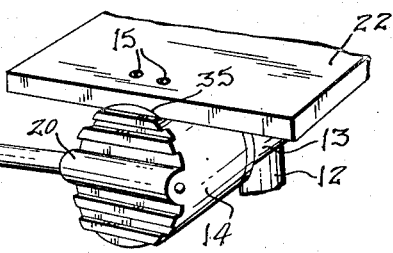
Fig. 8 is a side view of a portion of the mount and illustrates the adjustability of the camera clamping means.

In order to secure the turn table in any desired position a screw 36, see Figs. 5 to 7, having a knob 37 is threaded through a block 38 fastened on base plate 22, said screw also passing through a hole in guide plate 23 in such manner that when drawn up in said block it jams circular plate 25 in whatever position it may be at the time.

In order accurately to set camera supporting plate 32 levelly along either horizontal axis two liquid levels are supported at right angles to one another on rubber blocks 40 fastened to base plate 22 by screws 41 which also pass through the frame of the level.

Each level comprises a block 42 (Figs. 3, 4, 5, 6 and 7) having a recess 43 in which is mounted a tube 44 full of liquid except for an air bubble, the recess being covered by a thin plate 45 having a sight opening 46 and said tube having two hair lines to indicate, when said bubble lies between them, that the tube is level.

It will be seen that as handle 21 is manipulated as described above, the right angled levels will indicate to the operator the levelness of the camera on plate 32.

The purpose of the rubber pads 40 (Figs. 3 and 4) is to provide for adjustment of the levels. It sometimes happens that the base of a camera is itself slightly off, in which case the level or levels are adjusted accordingly by tightening upon the screw 41 at one or the other of the ends of the level.

An auxiliary clamping device is also provided, said device being adjustable to effect clamping of cameras of a wide variety of sizes. To the rear face of camera supporting plate 32 is adjustably secured by screws 47 threaded into cross bars 31 and having knobs 48, a clamping block 50 (Figs. 3-7). For cameras of a size equal to or greater than the plate 32, the block 50 and its adjusting screws are all that are needed, but in order to provide for cameras smaller than said plate, a second clamping block 51 is hinged to the top of block 50, said block 51 being adapted to be swung to one of the positions shown in Fig. 8 to act on a small camera.

In the drawings, blocks 50 and 51 are connected by an external hinge 52 and the block 50 is provided on either side of said hinge with pads 53 to present a smooth surface to the base of a camera, however, in practical production the hinge would be internal of the blocks and the pads done away with.

To mount a camera on plate 32, the screw 33 is first drawn up in the hole provided in the camera base and then the clamping block 50 or 51 is tightened against the camera by screws 47.

Figure 10:
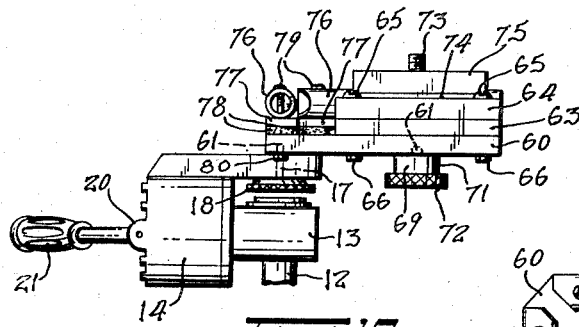
Fig. 10 is a view similar to Fig. 7, but illustrating the camera mount constructed in accordance with a modification of the present invention.
Figure 11:
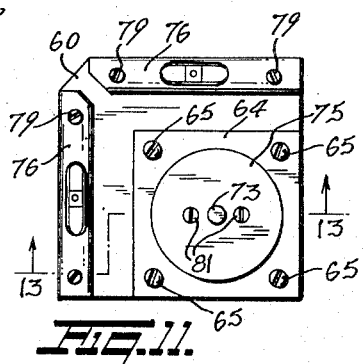
Fig. 11 is a plan view of the camera mount, per se.
Figure 12:
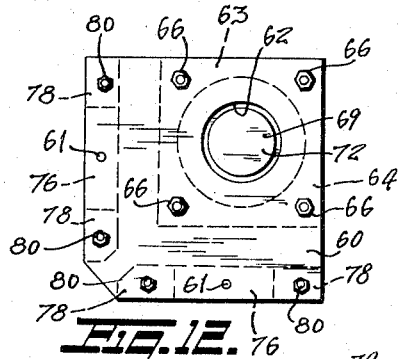
Fig. 12 is a bottom plan view of Fig. 11.

The camera mount in accordance with the modification of the invention shown in Figs. 10 to 13, comprises a base plate 60 provided adjacent two of its sides with threaded holes 61, see Figs. 10 and 12, with which the screw 17 of the pan head of the tripod stand can be selectively engaged for fixedly mounting the base plate 60 on the supporting plate 16.

Figure 13:
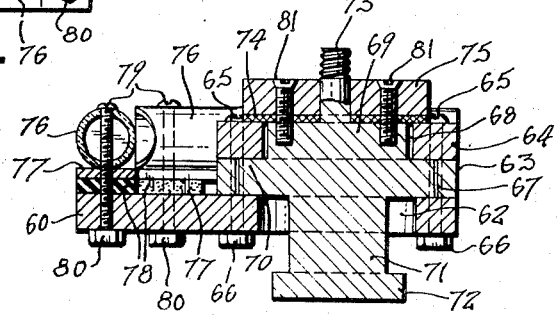
Fig. 13 is an enlarged vertical sectional view taken on the line 13—13 of Fig. 11.

Adjacent one corner, the base plate 60 is formed with a hole 62 and mounted in position over the hole 62, concentric therewith, there are superimposed plates 63 and 64. The plates 63 and 64 are secured in position on the base plate 60 by means of bolts 65 which pass through aligned holes formed in the plates 60, 63 and 64 and which are engaged with nuts 66 beneath the base plate 60. The plate 63 is formed with a hole 67 just slightly larger than the hole 62 in the base plate 60. The plate 64 is formed with a hole 68 which is just slightly smaller than the hole 62 in the base plate 60. As shown in Fig. 13, the holes 62, 67 and 68 are formed in the respective plates concentric with relation to each other.

Mounted concentrically through the holes, there is a turnable member 69 which is formed intermediate of its ends with an enlarged flange 70 of a size just slightly smaller than the hole 67 in the plate 63. Thus, the flange 70 is located between the adjacent faces of the plates 60 and 64 to rotatively retain the turnable member 69 in position.

At its bottom, the turnable member 69 continues into a reduced neck portion 71 of a size considerably smaller than the hole 62 in the base plate 60 and which projects through that hole. At its lower end the neck portion 71 is formed with a knurled knob 72 by which a grip may be had on the turnable member for a purpose which will become clear as this specification proceeds.

The upper end of the turnable member 69 continues into a threaded stud 73 which is extended freely through a fibre bearing disc 74 and a top platform disc 75. The fibre disc 74 and the platform disc 75 are of like size and each is of a diameter slightly greater than the diameter of the hole 68 in the plate 64 and are secured to the turnable member 69 by screws 81. As clearly shown in Figs. 10 and 13, the top end of the threaded stud 73 projects above the top face of the platform disc 75 to be threaded into the tripod socket in the bottom of the particular camera to be mounted on the camera mount. To thread the stud 73 into the tripod socket of the camera, the entire turnable member 69 is rotated relative to the plates 60, 63 and 64, by gripping the knurled knob 72 and turning the same. This will cause the camera to be drawn fixedly into position on the top face of the platform disc 75 so that the camera may be turned on a horizontal level relative to the tripod and the base plate 60, during which turning, the turnable member 69 will turn with the camera.

Also mounted on the base plate 60 along two adjacent sides thereof, there is a pair of spirit levels 76. The levels 76, as shown in Figs. 11 and 12 are extended at right angles to each other. Extended beneath each of the spirit levels 76 there is an elongated mounting plate 77. Disposed between adjacent faces of the mounting plates 77 and the base plate 60, at the ends of the mounting plates, there are blocks of resilient material 78. The spirit levels 76, the mounting plates 77 and the blocks of resilient material 78 are secured in position on the top face of the base plate 60 by means of bolts 79 which are freely passed through those parts and which are engaged with nuts 80 at the bottom face of the base plate 60.

The blocks of resilient material 78 are preferably formed of rubber and permit adjustments of the spirit levels 76 with relation to the base plate 60 to compensate for any unevenness in the surfaces of the base plate 60 or the mounting plates 77.

The manner of using the camera mount of this modification of the present invention is exactly the same as the manner of using the camera mount of the first form of the invention and a further description of the modified form of camera mount is believed to be unnecessary.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. The combination with a tripod camera stand comprising three legs joined together in a pivot block, a vertical post mounted in said block, a horizontal member journalled at one end on said post, a housing journalled on the other end of said member, a handle projecting from said housing whereby the housing can be swivelled about said member, and said member can be swivelled about said post, a support plate mounted on said housing and projecting horizontally above said member, of an independently swivelable camera mount comprising a base plate secured on said support plate, a guide plate mounted on said base plate and having a circular cutout, a third plate mounted above said guide plate and having a circular cutout concentric with but smaller than the cutout in said guide plate, a circular plate turnably mounted in the first said cutout, a pair of pillars projecting upward from said circular plate, and a camera support plate mounted on said pillars.

2. The combination of a tripod camera stand including a support plate swivelable about its horizontal and vertical axes, with an independently horizontally swivelable camera mount comprising a base plate fastened on said support plate, a guide plate mounted on said base plate and having a circular cutout, a third plate mounted on said guide plate and having a circular cutout concentric with and smaller than the first mentioned cutout, and a camera supporting turn table mounted on said base plate and guided by said guide plate and said third plate, said turn table comprising a circular plate swivelably mounted in the first said cutout, a pair of pillars projecting upward from said circular plate and a camera supporting plate mounted on said pillars.

3. The combination of a tripod camera stand including a support plate swivelable about its horizontal and vertical axes, with an independently horizontally swivelable camera mount comprising a base plate fastened on said support plate, a guide plate mounted on said base plate and having a circular cutout, a third plate mounted on said guide plate and having a circular cutout concentric with and smaller than the first mentioned cutout, and a camera supporting turn table mounted on said base plate and guided by said guide plate and said third plate, said turn table comprising a circular plate swivelably mounted in the first said cutout, a pair of pillars projecting upward from said circular plate and a camera supporting plate mounted on said pillars, and a screw projecting upward through the center of the last said plate to secure a camera thereon, said screw having a large head for manipulation by the fingers.

4. The combination of a tripod camera stand including a cylindrical housing swivelable about its horizontal and vertical axes, with an independently horizontally swivelable camera mount comprising a base plate fastened on said cylindrical housing, a guide plate mounted on said base plate and having a circular cutout, a third plate mounted on said guide plate, and having a circular cutout concentric with and smaller than the first mentioned cutout, and a camera supporting turn table mounted on said base plate and guided by said guide plate and said third plate, said turn table comprising a circular plate swivelably mounted in the first said cutout, a pair of pillars projecting upward from said circular plate and a camera supporting plate mounted on said pillars.

5. The combination of a tripod camera stand including a cylindrical housing swivelable about its horizontal and vertical axes, with an independently horizontally swivelable camera mount comprising a base plate fastened on said cylindrical housing, a guide plate mounted on said base plate and having a circular cutout, a third plate mounted on said guide plate, and having a circular cutout concentric with and smaller than the first mentioned cutout, and a camera supporting turn table mounted on said base plate and guided by said guide plate and said third plate, said turn table comprising a circular plate swivelably mounted in the first said cutout, a pair of pillars projecting upward from said circular plate and a camera supporting plate mounted on said pillars, and a screw projecting upward through the center of the last said plate to secure a camera thereon, said screw having a large head for manipulation by the fingers.

6. The combination of a tripod camera stand including a support plate swivelable about its horizontal and vertical axes, with an independently horizontally swivelable camera mount comprising a base plate fastened on said support plate, a guide plate mounted on said base plate and having a circular cutout, a third plate mounted on said guide plate and having a circular cutout concentric with and smaller than the first mentioned cutout, and a camera supporting turn table mounted on said base plate and guided by said guide plate and said third plate, said turn table comprising a circular plate swivelably mounted in the first said cutout, a pair of pillars projecting upward from said circular plate and a camera supporting plate mounted on said pillars, and a screw projecting upward through the center of the last said plate to secure a camera thereon, said screw having a large head for manipulation by the fingers, and an auxiliary camera clamp comprising a pair of cross bars secured to said camera supporting plate, a clamping block abutting one edge of said camera supporting plate, and a pair of adjusting screws passed through said blocks and threaded each into one of said cross bars, said block moving toward or away from said plate as the screws are tightened or loosened.

7. The combination of a tripod camera stand including a support plate swivelable about its horizontal and vertical axes, with an independently horizontally swivelable camera mount comprising a base plate fastened on said support plate, a guide plate mounted on said base plate and having a circular cutout, a third plate mounted on said guide plate and having a circular cutout concentric with and smaller than the first mentioned cutout, and a camera supporting turn table mounted on said base plate and guided by said guide plate and said third plate, said turn table comprising a circular plate swivelably mounted in the first said cutout, a pair of pillars projecting upward from said circular plate and a camera supporting plate mounted on said pillars, and a screw projecting upward through the center of the last said plate to secure a camera thereon, said screw having a large head for manipulation by the fingers, and an auxiliary camera clamp comprising a pair of cross bars secured to said camera supporting plate, a clamping block abutting one edge of said camera supporting plate, and a pair of adjusting screws passed through said blocks and threaded each into one of said cross bars, said block moving toward or away from said plate as the screws are tightened or loosened, and a second clamping block hinged to the first clamping block for clamping cameras of sizes smaller than the camera supporting plate.

8. The combination of a tripod camera stand including a cylindrical housing swivelable about its horizontal and vertical axes, with an independently horizontally swivelable camera mount comprising a base plate fastened on said cylindrical housing, a guide plate mounted on said base plate and having a circular cutout, a third plate mounted on said guide plate, and having a circular cutout concentric with and smaller than the first mentioned cutout, and a camera supporting turn table mounted on said base plate and guided by said guide plate and said third plate, said turn table comprising a circular plate swivelably mounted in the first said cutout, a pair of pillars projecting upward from said circular plate and a camera supporting plate mounted on said pillars, and a screw projecting upward through the center of the last said plate to secure a camera thereon, said screw having a large head for manipulation by the fingers, and a pair of level indicators mounted on said base plate at right angles to one another.

9. The combination of a tripod camera stand including a cylindrical housing swivelable about its horizontal and vertical axes, with an independently horizontally swivelable camera mount comprising a base plate fastened on said cylindrical housing, a guide plate mounted on said base plate and having a circular cutout, a third plate mounted on said guide plate, and having a circular cutout concentric with and smaller than the first mentioned cutout, and a camera supporting turn table mounted on said base plate and guided by said guide plate and said third plate, said turn table comprising a circular plate swivelably mounted in the first said cutout, a pair of pillars projecting upward from said circular plate and a camera supporting plate mounted on said pillars, and a screw projecting upward through the center of the last said plate to secure a camera thereon, said screw having a large head for manipulation by the fingers, and an auxiliary camera clamp comprising a pair of cross bars secured to said camera supporting plate, a clamping block abutting one edge of said camera supporting plate, and a pair of adjusting screws passed through said blocks and threaded each into one of said cross bars, said block moving toward or away from said plate as the screws are tightened or loosened, and a pair of level indicators mounted on said base plate at right angles to one another.

10. The combination of a tripod camera stand including a support plate swivelable about its horizontal and vertical axes, with an independently horizontally swivelable camera mount comprising a base plate fastened on said support plate, a guide plate mounted on said base plate and having a circular cutout, a third plate mounted on said guide plate and having a circular cutout concentric with and smaller than the first mentioned cutout, and a camera supporting turn table mounted on said base plate and guided by said guide plate and said third plate, said turn table comprising a circular plate swivelably mounted in the first said cutout, a pair of pillars projecting upward from said circular plate and a camera supporting plate mounted on said pillars, and a screw projecting upward through the center of the last said plate to secure a camera thereon, said screw having a large head for manipulation by the fingers, and an auxiliary camera clamp comprising a pair of cross bars secured to said camera supporting plate, a clamping block abutting one edge of said camera supporting plate, and a pair of adjusting screws passed through said blocks and threaded each into one of said cross bars, said block moving toward or away from said plate as the screws are tightened or loosened, and a second clamping block hinged to the first clamping block for clamping cameras of sizes smaller than the camera supporting plate, and a pair of level indicators mounted on said base plate at right angles to one another.

11. The combination of a tripod camera stand including a cylindrical housing swivelable about its horizontal and vertical axes, with an independently horizontally swivelable camera mount comprising a base plate fastened on said cylindrical housing, a guide plate mounted on said base plate and having a circular cutout, a third plate mounted on said guide plate, and having a circular cutout concentric with and smaller than the first mentioned cutout, and a camera supporting turn table mounted on said base plate and guided by said guide plate and said third plate, said turn table comprising a circular plate swivelably mounted in the first said cutout, a pair of pillars projecting upward from said circular plate and a camera supporting plate mounted on said pillars, and a screw projecting upward through the center of the last said plate to secure a camera thereon, said screw having a large head for manipulation by the fingers, and an auxiliary camera clamp comprising a pair of cross bars secured to said camera supporting plate, a clamping block abutting one edge of said camera supporting plate, and a pair of adjusting screws passed through said blocks and threaded each into one of said cross bars, said block moving toward or away from said plate as the screws are tightened or loosened, and a second clamping block hinged to the first clamping block for clamping cameras of sizes smaller than the camera supporting plate.

12. The combination of a tripod camera stand including a cylindrical housing swivelable about its horizontal and vertical axes, with an independently horizontally swivelable camera mount comprising a base plate fastened on said cylindrical housing, a guide plate mounted on said base plate and having a circular cutout, a third plate mounted on said guide plate, and having a circular cutout concentric with and smaller than the first mentioned cutout, and a camera supporting turn table mounted on said base plate and guided by said guide plate and said third plate, said turn table comprising a circular plate swivelably mounted in the first said cutout, a pair of pillars projecting upward from said circular plate and a camera supporting plate mounted on said pillars, and a screw projecting upward through the center of the last said plate to secure a camera thereon, said screw having a large head for manipulation by the fingers, and an auxiliary camera clamp comprising a pair of cross bars secured to said camera supporting plate, a clamping block abutting one edge of said camera supporting plate, and a pair of adjusting screws passed through said blocks and threaded each into one of said cross bars, said block moving toward or away from said plate as the screws are tightened or loosened, and a second clamping block hinged to the first clamping block for clamping cameras of sizes smaller than the camera supporting plate, and a pair of level indicators mounted on said base plate at right angles to one another.

OTTO BLUM.

REFERENCES CITED

The following references are of record in the file of this patent:

UNITED STATES PATENTS

| Number | Name | Date |
|---|---|---|
| 1,854,951 | Neuwirth | Apr. 19, 1932 |
| 2,429,803 | Cardona | Oct. 28, 1947 |
| 2,434,829 | Bertzman | Jan. 20, 1948 |